United States Patent
Gailey et al.

(10) Patent No.: US 7,233,655 B2
(45) Date of Patent: Jun. 19, 2007

(54) MULTI-MODAL CALLBACK

(75) Inventors: Michael L. Gailey, Dunwoody, GA (US); Eric A. Portman, Norcross, GA (US); Michael J. Burgiss, Smyrna, GA (US)

(73) Assignee: Accenture Global Services GmbH, Schaffhausen (CH)

(*) Notice: Subject to any disclaimer, the term of this patent is extended or adjusted under 35 U.S.C. 154(b) by 119 days.

(21) Appl. No.: 10/263,501

(22) Filed: Oct. 3, 2002

(65) Prior Publication Data

US 2003/0064716 A1 Apr. 3, 2003

Related U.S. Application Data

(60) Provisional application No. 60/326,902, filed on Oct. 3, 2001.

(51) Int. Cl.
*H04M 3/42* (2006.01)

(52) U.S. Cl. .............. 379/210.01; 379/52; 379/88.13; 455/414.4; 704/260; 709/206

(58) Field of Classification Search ............ 455/414, 455/426.1; 379/88.12, 88.13, 52, 88.14, 379/210.01; 704/260; 709/206
See application file for complete search history.

(56) References Cited

U.S. PATENT DOCUMENTS

| | | | |
|---|---|---|---|
| 5,561,769 A | 10/1996 | Kumar et al. | |
| 5,675,507 A | 10/1997 | Bobo, II | |
| 5,764,762 A | 6/1998 | Kazmierczak et al. | |
| 5,850,517 A | 12/1998 | Verkler et al. | |
| 5,862,325 A | 1/1999 | Reed et al. | |
| 5,870,549 A | 2/1999 | Bobo, II | |
| 5,884,262 A * | 3/1999 | Wise et al. | 704/270.1 |
| 5,905,736 A | 5/1999 | Ronen et al. | |
| 5,920,835 A | 7/1999 | Huzenlaub et al. | |

(Continued)

FOREIGN PATENT DOCUMENTS

DE  19756851 A1  7/1999

(Continued)

OTHER PUBLICATIONS

"Digital cellular telecommunications system (Phase 2+) (GSM); Universal Mobile Telecommunications System (UMTS); Functional stage 2 description of location services (GPP TS 23.271 version 5.2.0 Release 5); ETSI TS 123 271" ETSI Standards, European Tellecommunication Standards Institute; Sophia-Antipo, FR, vol. 3-SA2, No. V520, Mar. 2002 XP014007890.

*Primary Examiner*—Fan Tsang
*Assistant Examiner*—M. S. A. Elahee
(74) *Attorney, Agent, or Firm*—Brinks Hofer Gilson & Lione

(57) ABSTRACT

A method and system for generating multi-modal callback messages for a user of a wireless terminal connected to an access network. A multi-modal response is generated in response to a request for information with a multi-modal callback server. The multi-modal response is transmitted to the wireless terminal using the access network. A text-based response is included in the multi-modal response that includes a means for allowing a predetermined portion of the multi-modal response to be read aloud to the user of the wireless terminal or another message may be read aloud to the user.

33 Claims, 4 Drawing Sheets

U.S. PATENT DOCUMENTS

| | | | |
|---|---|---|---|
| 5,953,392 A | 9/1999 | Rhie et al. | |
| 6,052,367 A | 4/2000 | Bowater et al. | |
| 6,070,189 A | 5/2000 | Bender et al. | |
| 6,119,167 A | 9/2000 | Boyle et al. | |
| 6,138,158 A | 10/2000 | Boyle et al. | |
| 6,157,941 A | 12/2000 | Verkler et al. | |
| 6,161,139 A | 12/2000 | Win et al. | |
| 6,173,259 B1 | 1/2001 | Bijl et al. | |
| 6,181,781 B1 | 1/2001 | Porter et al. | |
| 6,182,142 B1 | 1/2001 | Win et al. | |
| 6,182,144 B1 | 1/2001 | England | |
| 6,219,638 B1 | 4/2001 | Padmanabhan et al. | |
| 6,236,768 B1 | 5/2001 | Rhodes et al. | 382/306 |
| 6,249,291 B1 | 6/2001 | Popp et al. | |
| 6,263,358 B1 | 7/2001 | Lee et al. | |
| 6,282,270 B1 | 8/2001 | Porter | |
| 6,301,245 B1 | 10/2001 | Luzeski et al. | |
| 6,314,108 B1 | 11/2001 | Ramasubramani et al. | |
| 6,333,973 B1 | 12/2001 | Smith et al. | |
| 6,385,586 B1 | 5/2002 | Dietz | |
| 6,393,467 B1 | 5/2002 | Potvin | |
| 6,453,337 B2 | 9/2002 | Miller et al. | |
| 6,473,612 B1 | 10/2002 | Cox et al. | |
| 6,483,899 B2 | 11/2002 | Agraharam et al. | |
| 6,504,910 B1 | 1/2003 | Engelke et al. | |
| 6,510,417 B1 | 1/2003 | Woods et al. | 704/275 |
| 6,513,003 B1 | 1/2003 | Angell et al. | |
| 6,516,316 B1 | 2/2003 | Ramasubramani et al. | |
| 6,523,063 B1 | 2/2003 | Miller et al. | |
| 6,587,835 B1 | 7/2003 | Treyz et al. | 705/14 |
| 6,594,348 B1 * | 7/2003 | Bjurstrom et al. | 379/88.13 |
| 6,598,018 B1 * | 7/2003 | Junqua | 704/251 |
| 6,647,257 B2 * | 11/2003 | Owensby | 455/414.1 |
| 6,697,474 B1 | 2/2004 | Hanson et al. | |
| 6,721,288 B1 | 4/2004 | King et al. | |
| 6,725,252 B1 | 4/2004 | Himmel et al. | |
| 6,728,758 B2 | 4/2004 | Sato | |
| 6,742,022 B1 | 5/2004 | King et al. | |
| 6,775,360 B2 * | 8/2004 | Davidson et al. | 379/88.14 |
| 6,782,253 B1 * | 8/2004 | Shteyn et al. | 455/414.1 |
| 6,782,419 B2 | 8/2004 | Tobita et al. | |
| 6,816,835 B2 * | 11/2004 | Hayashi | 704/260 |
| 6,820,204 B1 | 11/2004 | Desai et al. | |
| 6,826,407 B1 | 11/2004 | Helferich | |
| 6,826,692 B1 | 11/2004 | White | |
| 6,829,334 B1 * | 12/2004 | Zirngibl et al. | 379/88.17 |
| 6,859,451 B1 | 2/2005 | Pasternack et al. | |
| 6,895,084 B1 | 5/2005 | Saylor et al. | 379/88.22 |
| 6,898,571 B1 | 5/2005 | Val et al. | |
| 6,907,112 B1 | 6/2005 | Guedalia et al. | |
| 6,912,582 B2 | 6/2005 | Guo et al. | |
| 6,925,307 B1 | 8/2005 | Mamdani et al. | |
| 6,950,947 B1 | 9/2005 | Purtell et al. | |
| 7,020,251 B2 | 3/2006 | Zirngibl et al. | |
| 2002/0035607 A1 | 3/2002 | Checkoway et al. | |
| 2002/0091829 A1 | 7/2002 | Wood et al. | |
| 2002/0107925 A1 | 8/2002 | Goldschneider et al. | |
| 2002/0112007 A1 | 8/2002 | Wood et al. | |
| 2002/0119793 A1 | 8/2002 | Hronek et al. | |
| 2002/0137491 A1 | 9/2002 | Pentikainen et al. | |
| 2003/0008661 A1 | 1/2003 | Joyce et al. | |
| 2003/0064709 A1 | 4/2003 | Gailey et al. | |
| 2003/0065620 A1 | 4/2003 | Gailey et al. | |

FOREIGN PATENT DOCUMENTS

| | | |
|---|---|---|
| WO | WO 99/55049 A1 | 10/1999 |
| WO | WO 00/17854 A1 | 3/2000 |
| WO | WO 00/21232 A2 | 4/2000 |
| WO | WO 00/21232 A3 | 11/2000 |
| WO | WO 01/03011 A2 | 1/2001 |
| WO | WO 01/69422 A2 | 9/2001 |
| WO | WO 01/03011 A3 | 1/2003 |

* cited by examiner

MULTI-MODAL CALLBACK

This application claims the benefit under 35 U.S.C. §119 of U.S. Provisional Application Ser. No. 60/326,902 which was filed on Oct. 3, 2001 and entitled Multi-Modal Callback.

FIELD OF THE INVENTION

The present invention relates generally to wireless communication systems and more particularly, to a multi-modal callback system that is capable of generating text-based messages that may be verbally read back to users of wireless terminals.

BACKGROUND OF THE INVENTION

Wireless communication devices have recently evolved from a technology used by an elite segment of the population to a technology that is used by the masses. Worldwide, the number of wireless communication device users has reached a staggering number and is growing all of the time. In the near future, it is envisioned that almost everyone will own or use some sort of wireless communication device that is capable of performing a variety of functions. In addition to traditional wireless communication devices, many different types of portable electronic devices are in use today. In particular, notebook computers, palm-top computers, and personal digital assistants (PDA) are commonplace.

Users of wireless telephones and other wireless devices have recently been able to place a phone call to an automated system to request information by speaking to a basic automated speech recognition system. The basic automated speech recognition system typically responds to the caller using text-to-speech and/or recorded speech prompts. This method of information delivery is cumbersome and challenging for the caller as well as very time consuming, thereby causing callers unnecessary frustration. In some cases, the system returns too much information and the caller must listen to the entire response in order to get the information they want. In other systems the caller must verbally navigate through a deep hierarchy of prompts to get to the specific piece of information they seek.

Wireless terminal users may receive services through their respective wireless terminals by calling an automated or operator-assisted service. These services may respond to the caller by allowing the user to navigate through a menu of items that are presented by the automated operator. With the advent of multi-modal messaging, users can now receive messages in a multiple variety of formats. However, some of these formats can more easily/effectively be comprehended in the form of human speech rather than text.

As such, a need exists for a method of enabling the caller to reply via text to the text message sent by the system in order to initiate a phone call to the wireless terminal during which the information in the message, or additional information, is read aloud to the caller.

SUMMARY OF THE INVENTION

A preferred embodiment of the present invention discloses a method for audibly reproducing messages and text-based messages for a remote terminal in a wireless communication system. In the preferred embodiment, a text-based message is generated on a wireless terminal that includes a callback request indicator. Selection of the callback request indicator causes the wireless terminal to transmit a callback request to a multi-modal callback server.

In one embodiment of the present invention, the multi-modal callback server then converts the text-based message into a voice-based message and transmits the voice-based message to the wireless terminal. In another preferrred embodiment of the present invention, the text-based message may merely indicate that a second message may be read to the user. Selection of the callback request indicator will cause the multi-modal callback server to connect with the wireless terminal and audibly reproduce a second message to the user.

Another preferred embodiment of the present invention discloses a method of providing multi-modal callback in a wireless communication system. The preferred method discloses generating a request for information using a wireless terminal and transmitting the request for information to a multi-modal callback server. A multi-modal response is generated to the request for information with a response generation application and is transmitted to the wireless terminal. Selecting a callback request item contained in an interaction menu of the multi-modal response with the wireless terminal transmits a callback request to the multi-modal callback server based on the selection of the callback request item. A callback response is generated by the multi-modal callback server that is based on the callback request. The callback response is then transmitted to the wireless terminal.

In the preferred embodiment of the present invention, the callback response is an automated voice-based response. The callback response is preferentially transformed into a voice-based response with a text-to-voice application. After the multi-modal response is generated and sent to the wireless terminal, the wireless terminal is disconnected from the multi-modal callback server to conserve resources and reduces costs to the user.

The preferred request for information is a voice-based request for information. A plurality of words contained in the voice-based request for information are identified using a voice recognition application. An intent associated with the identified words is determined using a natural language processing application. The multi-modal response is generated based on the identity of the words and their respective intent. A geographic location of the wireless terminal can be determined using a geographic location application. The multi-modal response can also be based at least in part on the geographic location of the wireless terminal.

Another preferred embodiment of the present invention discloses a multi-modal callback system. The preferred multi-modal callback system includes a wireless terminal that is connected to an access network. The wireless terminal is operable to generate a request for information. A multi-modal callback server is connected to the access network, thereby connecting the multi-modal callback server to the wireless terminal. A response generation application located on the multi-modal callback server is operable to generate a multi-modal response to the request for information that is sent to the wireless terminal. The multi-modal response preferentially includes a text-based response that includes a means for having a predetermined portion or all of the text-based response read aloud to a user of the wireless terminal.

The means for having the text-based response read aloud to the user of the wireless terminal preferentially includes an interaction menu selection item that is generated on a display of the wireless terminal, a predetermined keypad key of the wireless terminal, a voice-based command generated by a user of the wireless terminal or selection of an item generated on the display with a pointing device of the wireless terminal. Selection of one of these means for having the text-based response read aloud to the user of the wireless terminal will cause a call to be made to the multi-modal callback server, which will in turn call the wireless terminal back and read aloud the text-based response. The text-based response is read aloud by processing the text-based response with a text-to-voice application located on the multi-modal callback server, which allows the text of the text-based response to be read to the user.

The preferred embodiment may also include a geographic location application that is used to determine a geographic location of the wireless terminal. The multi-modal response is preferentially also generated as a function of the geographic location of the wireless terminal. As such, the multi-modal responses that are generated by the response generation application of the multi-modal callback server can be geographically tailored to provide responses that are related to the geographic location of the wireless terminal. For example, if a user wants directions to a particular establishment the response generation application will use the geographic location of the wireless terminal as a starting point so that more accurate directions can be provided.

In the preferred multi-modal callback system, the request for information is a voice-based request for information. The multi-modal callback system includes a voice recognition application that is operable to identify a plurality of words contained in the voice-based request for information. A natural language processing application is operable to determine an intent associated with the words can also be used to generate the multi-modal response. This allows the multi-modal callback system to provide answers to consumer requests that are more relevant by targeting the response generation application to specific areas of information contained in a data content database.

Another preferred embodiment of the present invention discloses a method of generating multi-modal messages for a user of a wireless terminal connected to an access network. In this preferred embodiment, a multi-modal response is generated in response to a request for information received from the wireless terminal. The multi-modal response is then transmitted to the wireless terminal. A text-based response is included in the preferred multi-modal response that includes a means for allowing a predetermined portion of the text-based response to be read aloud to the user of the wireless terminal.

The means for having the text-based response read aloud to the user of the wireless terminal preferentially includes an interaction menu selection item generated on a display of the wireless terminal, a designated keypad key of the wireless terminal, a voice-based command generated by a user of the wireless terminal or a link that may be selected by a pointing device of the wireless terminal. As set forth above in the other preferred embodiments, selection of these means for having the text-based response read aloud to the user of the wireless terminal causes the multi-modal callback server to establish a connection with the wireless terminal and then the text is read aloud to the user.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
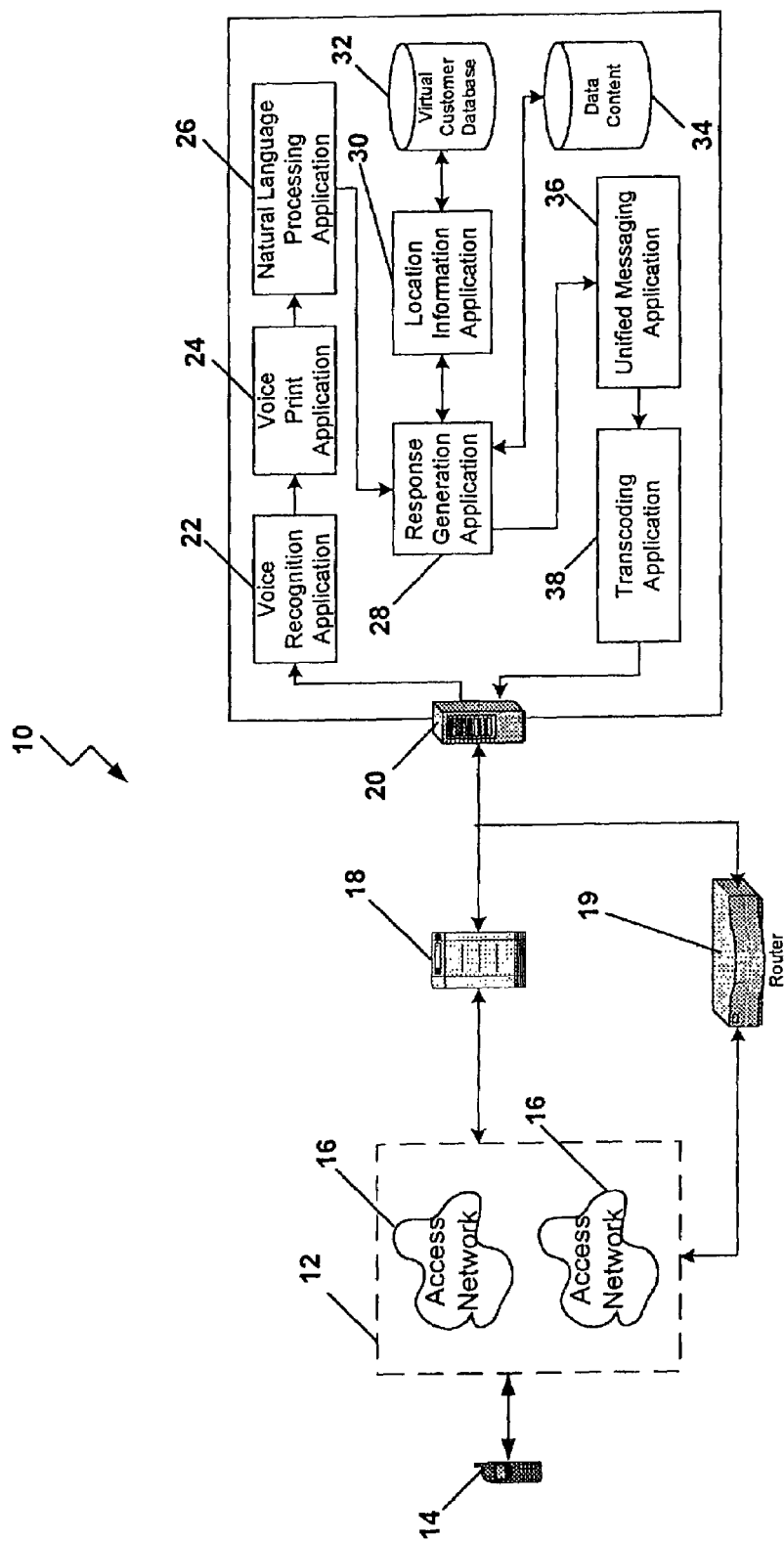
FIG. 1 illustrates a preferred embodiment of a multi-modal messaging system for a wireless communication system.

Referring to FIG. 1, the present invention discloses a multi-modal messaging system 10 for a wireless communication system 12. The wireless communication system 12 includes at least one wireless terminal 14 that is connected to at least one wireless access network 16. Although not illustrated, the wireless access network 16 generally includes a base station transceiver that is connected to a base station server. The base station server is connected to a network connection that may be a publicly switched telephone network or a private network. In the embodiment illustrated in FIG. 1, the wireless access network 16 is connected to at least one switch 18, thereby connecting the wireless terminal 14 to a multi-modal message server 20. However, as further illustrated in FIG. 1, the wireless access network 16 could also be connected to a router 19 in an IP-based wireless access network as the function of transferring data between the wireless terminal 14 and the multi-modal message server 20 is provided by both types of devices.

The multi-modal messaging system 10 discloses a method of communicating with a wireless terminal 14 using multiple modes of communication including, but not limited to, human speech and text-based messages during a single transaction or call. As set forth in detail below, wireless terminals 14 that are connected to the wireless access network 16 preferentially communicate with the multi-modal message server 20 via the wireless access network 16 to which the wireless terminal 14 is connected. Preferentially, the multi-modal messaging system 10 also includes an automated speech recognition application with which the user of the wireless terminal 14 interacts to request and receive information from various databases containing information from a plurality of businesses.

Referring to FIG. 1, during operation the wireless terminal 14 is capable of transmitting and receiving messages that may come in several formats. The preferred formats include human speech, which is produced using a speaker and a microphone, and text and graphic formats that are generated on a display of the wireless terminal 14. In the preferred embodiment of the present invention, the wireless terminal 14 preferentially transmits a tailored request for information to the multi-modal message server 20 in either human speech or text based message formats. Speech-based tailored requests for information are transmitted by means of a wireless telephone call as known in the art. Text-based tailored requests for information are transmitted in the form of a text message that is transmitted using a wireless communication protocol, including but not limited to a short message service ("SMS"), any wireless application protocol ("WAP"), or any email protocol.

In one preferred embodiment of the present invention, a user of the wireless terminal 14 establishes a connection with the multi-modal message server 20 by dialing a phone number that is associated with a participating company that operates the multi-modal message server 20. The act of dialing a predefined phone number associated with the multi-modal message server 20 causes the wireless access network 16 to connect the call to the multi-modal message server 20. In yet another preferred embodiment, the user of the wireless terminal 14 is capable of establishing a connection with the multi-modal message server 20 from an interactive menu that is generated on the wireless terminal 14 through a wireless application protocol or by predefined user or factory settings. Selecting a link or prompt to a respective multi-modal message server 20 contained in the interaction menu thereby establishes the connection between the remote terminal 14 and the multi-modal message server 20. In yet another preferred embodiment, the user may enter an address or universal resource locator ("URL") of the multi-modal message server 20 to establish the connection between the wireless terminal 14 and the multi-modal message server 20.

Although not specifically illustrated, the operator of the multi-modal message server 20 may or may not be the actual company from which data is sought by the user of the wireless terminal 14. The company operating the multi-modal message server 20 may be a third-party that is licensed or granted permission to provide certain types of data to consumers having remote terminals 14 that are associated with the company operating the multi-modal messaging system 10. For example, the provider of the wireless communication system 12 may have a contract with the operator of the multi-modal message server 20 and in turn, another company from which the user is seeking information may also have a contract with the operator of multi-modal message server 20. The cooperation of all parties in these embodiments enables the multi-modal messaging system 10 to function properly despite the varying types of contractual arrangements made between respective parties. Further, the multi-modal message server 20 may house the data files that contain the information requested by the user or the multi-modal message server 20 may be connected to several different company file servers that contain the desired information that is responsive to the requests for information that are generated by the wireless terminals 14.

In response to the requests for information that are generated by the wireless terminal 14, the multi-modal message server 20 generates structured responses that contain data that is responsive to the requests for information. In transmitting the structured responses to the wireless terminal 14, the multi-modal messaging system 10 can select from a group of modes of communication including, but not limited to, text modes, graphic modes, animation modes, multi-media modes, pre-recorded and synthesized sounds including synthesized human speech modes, music modes, and noise modes. In particular, the preferred multi-modal messaging system 10 uses at least two of the above-referenced modes to transmit responses to the wireless terminals 14 during a single transaction or user interaction.

As set forth above, the methods and protocols for transmitting information in the form of text from the multi-modal messaging system 10 to the wireless terminal 14 include, but are not limited to, SMSs, WAPs, and email protocols. In the case of audible information, the response is preferentially transmitted from the multi-modal message server 20 to the remote terminal 14 during a wireless telephone call that may be initiated by either the remote terminal 14 or the multi-modal message server 20. In yet another preferred embodiment of the present invention, the audible information contained in a response may be transmitted in an automated fashion using applications capable of synthesizing human speech and directing the synthesized human speech to a voice mail system associated with the intended recipient's wireless terminal 14. As used herein, the term voice mail system includes any system that is capable of receiving, storing and retrieving audible messages in an automated fashion either autonomously or on-demand via a telephone network. These include voice mail servers and both analog and digital answering machines.

As set forth above, the present invention discloses the use of more than one mode of communication during the course of a single interaction between the wireless terminal 14 and the multi-modal message server 20. A single interaction is defined as a set of messages required to meet the needs of a consumer or user of the wireless terminal 14 that is requesting a specific service, specific content, or specific information from the multi-modal message server 20 and the response or responses that are delivered by the multi-modal message server 20 in response to the requests for information from the wireless terminal 14. The present invention discloses methods of using multiple modes of communication between a respective remote terminal 14 and a respective multi-modal message server 20 during a single interaction, thereby allowing the multi-modal message server 20 to respond to the demands of the user using both voice and text-based messages, for example.

As set forth above, during operation the wireless terminal 14 is operable to generate tailored requests for information about a particular product or service. In the preferred embodiment, the multi-modal message server 20 responds to the wireless terminal 14 by sending content responsive to the tailored requests for information via messages that are formatted as a text-based message and a voice-based message. In other embodiments, the wireless terminal 14 may only be capable of conducting a wireless telephone call or the transmission or receipt of text messages, but not both operations at the same time. As such, in these embodiments of the present invention the multi-modal messaging system 10 is designed to provide the wireless terminal 14 with text-based messages that are responsive to the requests for information after the wireless telephone call has been disconnected and the user has already received the voice-based messages that are responsive to the requests for information. In addition, the voice call connection between the wireless terminal 14 and the multi-modal message server 20 and the text-based messages that are sent to the wireless terminal 14 may be transmitted from the multi-modal message server 20 using a dissimilar wireless communication protocol.

The multi-modal messaging system 10 preferentially also includes a voice recognition application 22. The voice recognition application 22 is preferentially located on the multi-modal message server 20, but may also be located on a separate server that is connected with the multi-modal message server 20. The voice recognition application 22 determines the identity of or recognizes respective words that are contained in voice-based requests for information that are generated by users of the wireless terminal 14. The words that are identified by the voice recognition application 22 are used as inputs to a response generation application 28 in one preferred embodiment of the present invention. As set forth in greater detail below, the response generation application 28 is capable of generating multi-modal responses that contain data responsive to the requests for information that are generated by the users of the wireless terminal 14. As further set forth in detail below, the words that are identified may also be used as an input to a natural language processing application 26 that determines the intent of the words contained in the requests for information and not just the identity of the words.

In another preferred embodiment of present invention, the multi-modal messaging system 10 includes a voice print application 24 that provides security to users of the wireless terminals 14 by analyzing voice prints of the user that are obtained by sampling segments of the user's speech. If the user is authenticated, access to the multi-modal messaging service 10 is provided to the user and if the user is not authenticated access is denied. Further, if the user desires to limit access to the multi-modal messaging system 10 to only themselves or select individuals, then a preference setting may be set by the owner of the wireless terminal 14 that restricts access to only pre-authorized users. The voice print application 24 can also be used to limit use of the wireless terminal 14 so that if the remote terminal 14 is stolen it will not be able to be used by the person who steals the wireless terminal 14. The voice print application 24 can also be used to determine if the user is an authorized user that can be provided with information related to a specific account by providing authorization and authentication. The voice print application 24 can be located on the multi-modal message server 20 or on a voice print application server that is connected to the multi-modal message server 20.

As briefly set forth above, in yet another preferred embodiment of the present invention the multi-modal messaging system 10 includes a natural language processing application 26. The natural language processing application 26 works in conjunction with the voice recognition application 22 to ascertain the meaning of natural language requests for information that are received from the wireless terminals 14. The natural language processing application 26 processes the identified words contained in the voice signals to ascertain the meaning or intent of the words that are contained in the voice signals. As such, during operation the voice recognition application 22 identifies or recognizes the particular words that are contained in the voice signals and the natural language processing application 26 interprets the meaning or intent of the recognized words contained in the voice signals. The natural language processing application 26 provides functionality to the multi-modal messaging system 10 that allows users to enter requests for information using natural language that is normally used in conversations between two human subjects.

The natural language processing application 26 may be located on the multi-modal message server 20, but, in an effort to increase the level of performance, could also be located on a separate server or a separate set of servers connected with the multi-modal message server 20. For a more detailed discussion of the preferred natural language processing application please refer to U.S. application Ser. No.: 10/131,898 entitled Natural Language Processing for a Location-Based Services System filed on Apr. 25, 2002 which is hereby incorporated by reference in its entirety.

As illustrated in FIG. 1, the natural language processing application 26 is connected to a response generation application 28 that uses a plurality of programmed rules in combination with the command or word contained in the request to determine what information should be retrieved and returned to the wireless terminal 14. The response generation application 28 uses the words identified by the voice recognition application 22 and the intent or meaning of the words determined by the natural language processing application 26 to generate a search query that retrieves the appropriate information from a content database 34. In other preferred embodiments, only the words identified from the voice recognition application 22 are used by the response generation application 28 to generate a response to the tailored requests for information.

In another preferred embodiment of the multi-modal messaging system 10, a location information application 30 is used to determine a geographic location of the wireless terminal 14. The location information application 30 may be located on the multi-modal message server 20 or on another server that is connected to the multi-modal message server 20. The geographic location of the user can be used to focus or narrow responses that are generated by the response generation application 28 to a specific geographic area that is appropriate to the user of the wireless terminal 14. Certain types of requests for information generated by users of the wireless terminals 14 will be dependent on the current geographic location of the wireless terminal 14 and the location information application 30 is used to provide the response generation application 28 with location data that is needed to generate a geographically tailored response to requests for information that are dependent on the geographic location of the wireless terminal 14.

The response generation application 28 may also be connected to a virtual customer database 32 that may use application and customer proprietary information to determine user preferences for modes of communication. In addition, the virtual customer database 32 may include customer data that includes information about the wireless terminal 14 that the user is using such as limitations for the amount or type of data content that the wireless terminal 14 can receive or the type of display used by the wireless terminal 14 so that responses can be structured in a format that is compatible with the display. In addition, the user may choose not to receive certain types of large files, such as multimedia files and so forth, and these settings may be found in the virtual customer database 32 in the profile of the user.

As set forth above, the response generation application 28 is used to generate structured responses to the tailored requests for information that are generated by the wireless terminal 14. Once the customer preferences and identification have been determined using the virtual customer database 32 and possibly the geographic location of the wireless terminal 14 has been determined using the location information application 30, a query is generated and sent to the content database 34 that is connected to the response generation application 28. The query is used to retrieve data that is responsive to the request for information from the content database 34. The content database 34 may be located locally on the multi-modal message server 20 or housed on other servers that are connected to the multi-modal message server 20. For example, if the wireless terminal 14 is connected to a multi-modal message server 20 provided by an airline company, the details of a flight that a user is booked on may be retrieved from the content database 34 if so desired.

Expanding on the example set forth above, let's say that the user of the wireless terminal 14 is a regular customer of the airline company and is registered with the airline company. The virtual customer database 32 will know this fact and will assist the response generation application 28 by providing detailed information to the response generation application 28 about that particular user. For example, the virtual customer database 32 may contain a customer identification number and a virtual key that is associated with that particular user. This information can be added to the query that is generated by the response generation application 28, which allows the response generation application to more accurately generate responses. The airline company multi-modal messaging system will be able to use this information to more accurately provide responses to the user that contain accurate data related to that particular user's account and status. Further, this information can be used for authorization and authentication purposes.

Once the data for the response to the user's request has been located by the response generation application 28, the multi-modal messaging system 10 prepares this data for transmission to the wireless terminal 14. A unified messaging application 36 preferentially combines the information retrieved into a unified response that can be sent to the wireless terminal 14 if the response generation application 28 does not format the response into the predefined message formats. In a preferred embodiment, the unified response that is generated contains a text-based response and a voice-based response that is created using the data that is provided by the response generation application 28. In essence, the unified message application 36 prepares the multi-modal response by generating a response in at least two formats that are suitable for the wireless terminal 14. As set forth above, these formats may include a text-based message, a graphics-based message, a voicemail message, and an email message.

After the unified message is created, a transcoding application 38 may be used to format the unified message into a format that is suitable for the wireless terminal 14 using information already known about the wireless terminal 14, which is preferentially retrieved from the virtual customer database 32. For example, for a text-based message, the transcoding application 38 may convert the text-based response into an SMS or WAP format. For a voice-based message, the transcoding application 38 may use a voice synthesis application to convert the speech-based response into a format suitable for the wireless terminal 14. The response is then sent to the wireless access network 16, which thereby transmits the multi-modal response to the wireless terminal 14.

Users of the wireless terminals 14 can define how they want the multi-modal messaging system 10 to send responses to them, or the multi-modal messaging system 10 may contain information, preferably stored in the virtual customer database 32, about each user of the multi-modal messaging system 10 and their respective remote terminals 14. This allows the multi-modal messaging system 10 to generate and transmit responses that are in the preferred format of the user. The multi-modal messaging system 10 allows users to determine what types of services and modes of communication will be used to transmit responses to the wireless terminal 14.

Referring to FIG. 1, in the preferred embodiment of the present invention a call is placed on the wireless access network 16 from the wireless terminal 14 to the multi-modal message server 20. In other preferred embodiments, a connection may be established between the wireless terminal 14 and the multi-modal message server 20 through the selection of a menu item or the entry of an address on the wireless terminal 14. The wireless terminal 14 also preferentially passes information to the multi-modal message server 20 about the wireless terminal 14 using SS7, ISDN, or other in-band or out-of-band messaging protocols. A calling number identification ("CNI") is preferentially passed as well as a serial number for the wireless terminal 14. This information can be used to determine the identity of the user to which the wireless terminal 14 belongs.

In one preferred embodiment, the multi-modal message server 20 uses an interface to detect the call and 'answers' the call from the wireless terminal 14 using text-to-speech messages or recorded speech prompts. The prompts can ask the user to speak the request for information using some set of predefined commands or may ask the user to utter the request for information using natural language, which will later be processed by the voice recognition application 22 and the natural language application 26. The text-to-speech messages or recorded speech prompts are transmitted across the wireless access network 16 to the wireless terminal 14.

During operation, the user speaks the request for information into the wireless terminal 14 and the wireless terminal 14 and wireless access network 16 transmit the voice signal representing the request for information to the multi-modal message server 20. Under one mode of operation, the user speaks one of a pre-defined command phrases or words, which is then interpreted and used by the voice recognition application 22 to generate a response. The user's speech is converted to text using the voice recognition application 22, which is then used as an input to a search query that interprets the user's command. As set forth below, based on the user's command, a response is generated by the responses generation application 28 that is sent to the user.

In one embodiment of the present invention, the multi-modal messaging system 10 incorporates a voice printing application 24 in conjunction with the database of proprietary customer information 34 to determine if the caller using the wireless terminal 14 is the owner of (or assigned to) the wireless terminal 14. If the caller is not the owner of the wireless terminal 14, (which may occur if someone borrows the wireless terminal 14 from the owner) the multi-modal messaging system 10 proceeds with the call but does not personalize any of the services based on proprietary customer information associated with the assigned user. Therefore, at any point in the process where the multi-modal messaging system 10 would use customer proprietary information, the multi-modal messaging system 10 could use additional prompts to request this information from the caller. The multi-modal messaging system 10 could also restrict access to the multi-modal messaging system 10 and the wireless terminal 14 altogether if the assigned user has preset a user preference indicating the restriction of access to unauthorized users.

In another preferred embodiment of the present invention, the multi-modal messaging system 10 can handle requests for information that are entered using natural speech. In this embodiment, the multi-modal messaging system 10 passes the text identified from the voice recognition application 22 to a natural language processing application 26 that is used to determine the intent or meaning of the words contained in the request. The interpreted intent is processed by the multi-modal messaging system 10 in the same way the pre-defined commands are processed. This is made possible because the natural language processing application 26 is programmed to generate search queries based on the words identified in the request and the intent of the words contained in the request.

The response generation application 28 uses programmed rules in combination with the commands to determine what information should be retrieved and returned to the wireless terminal 14. These rules are stored in executable code or in a content database 34. In one preferred embodiment of the present invention, if the multi-modal messaging system 10 determines that location information about the wireless terminal 14 is necessary to generate an appropriate response to the request for information, the multi-modal messaging system 10 uses the location information application 30 to determine the geographic location of the wireless terminal 14. The wireless access network 16 can use several location determining applications that are designed to sufficiently determine the geographic location of the wireless terminal 14 to the accuracy necessary to successfully generate a response that is responsive to the request for information. The location information that is generated by the location information application 30 is used as part of the search query that is used to locate the desired information.

Upon determining the data to be returned to the wireless terminal 14 and retrieving this data from a content database 34, the response generation application 28 of the multi-modal messaging system 10 prepares the content to be sent to the wireless terminal 14. The multi-modal messaging system 10 may use an application and customer proprietary information to determine the customer's preferences for modes of communication. Additionally, this customer data may include information about the wireless terminal 14 assigned to the user such as limitations for the amount or type of data content the device can receive. These methods for storing and accessing the customer proprietary data include those disclosed in a co-pending application entitled Virtual Customer Database, which was filed on the same day as the present application and assigned application Ser. No.: 10/264,219, which is hereby incorporated by reference in its entirety.

The multi-modal messaging system 10 formats the content contained in the response for the wireless terminal 14 using available information about the wireless terminal 14 and individual preferences of the users. A unified messaging application 36 preferentially formats the content into multiple messages, if necessary, to respond to the wireless terminal 14 in the most informative way that is compatible with the wireless terminal 14 to which the user is assigned or has purchased. The multi-modal messaging system 10 preferentially uses a transcoding application 38 to format the content contained in the response into a suitable format for the user's wireless terminal 14 and is capable of generating responses using formats such as WML, HTML, and plain text.

The multi-modal messaging system 10 then transmits the content to the wireless access network 16 operated by the carrier and indicates the recipient and the method for transferring the message(s) to the recipient or user. Preferably, the messages are sent as a text message to the wireless terminal 14 using any of (but not limited to) the following: SMS, CPDP, Mobitex. The wireless terminal 14 receives the message(s) and the user is allowed to interact with the content contained in the response from the multi-modal messaging system 10.

In yet another preferred embodiment of the present invention, the multi-modal messaging system 10 is used in combination with a location-based services system where the content of the messages between the system and the wireless terminal 14 contain information that is based on the current geographic location of the wireless terminal 14. The location-based services system may be of the type by which the indicator of the location of the wireless terminal 14 is generated by the wireless terminal 14 and transmitted to the multi-modal messaging system 10, determined by the multi-modal messaging system 10, or by some combination there of. For a more detailed description of location-based service systems, refer to U.S. application Ser. No.: 09/946,111, which was filed on Sep. 4, 2002 entitled Location-Based Services and is hereby incorporated by reference in its entirety.

Figure 2:
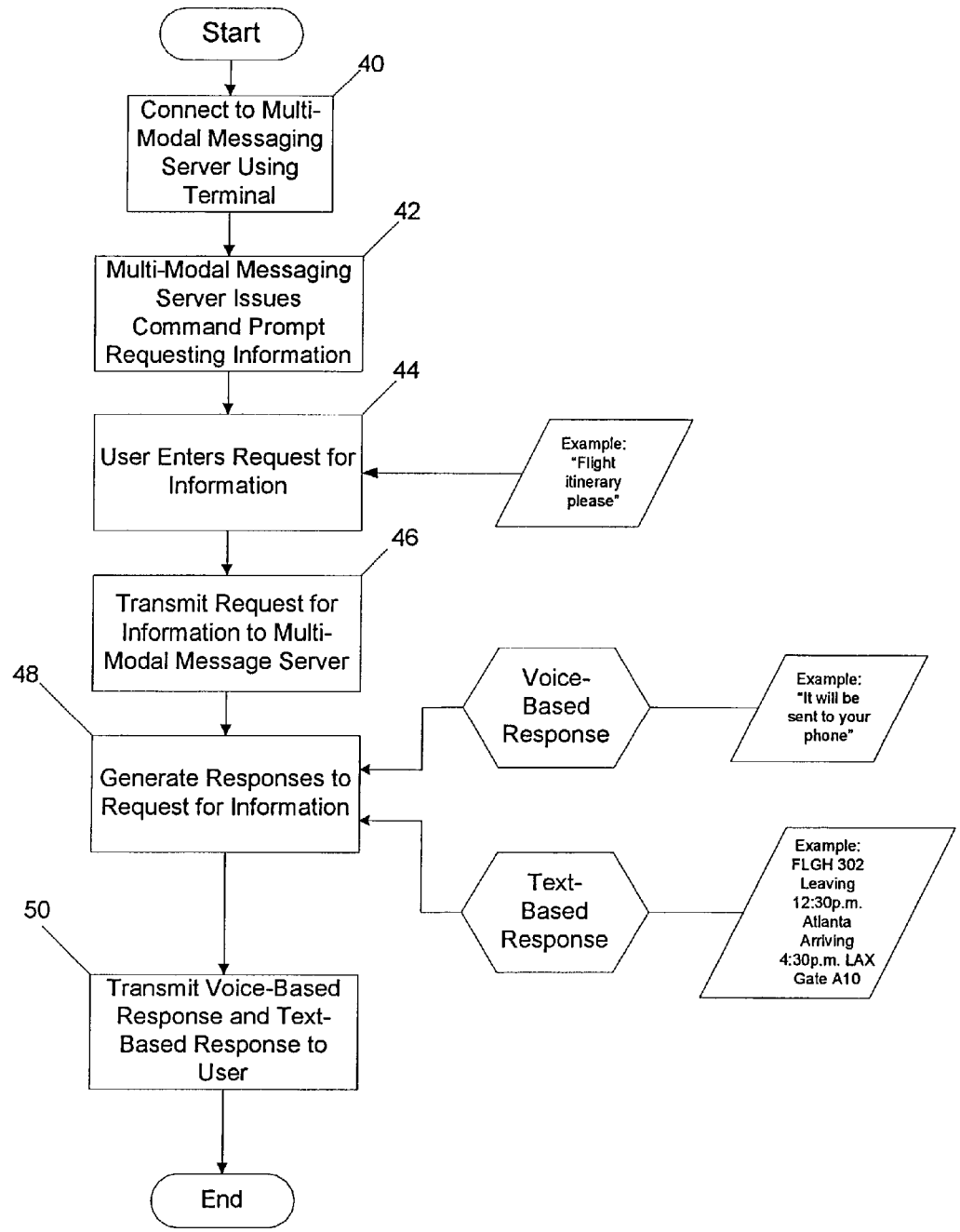
FIG. 2 illustrates the general process steps performed by a preferred embodiment of the multi-modal messaging system during an illustrative operation.

Referring to FIG. 2, an illustrative example of a preferred embodiment of the present invention is set forth below. As an example, let's say that a user of wireless terminal 14 is planning a trip and would like to check with his or her airline to determine their flight itinerary. At step 40 the user of wireless terminal 14 connects to the multi-modal messaging system 10 of the airline through the wireless access network 16. At step 42, the multi-modal messaging server 20 transmits a command prompt to the user requesting information from the user of the wireless terminal 14. In response, at step 44 the user states a voice request for information, which in this example is illustrated as "Flight itinerary please", which is transmitted to the multi-modal messaging server 20 at step 46.

At step 48, the multi-modal messaging system 10 takes this voice request for information and uses automated speech recognition, which in the preferred embodiment includes processing the voice request for information with a voice recognition application 22 and a natural language processing application 26, to generate a plurality of responses to the request for information. As an example, in the preferred embodiment illustrated in FIG. 2, a voice-based response is generated that states "It will be sent to your phone" and a text-based response is generated that provides the user with the appropriate itinerary information that is tailored for that particular user. At step 50, the multi-modal message server 20 transmits the multi-modal response to the user, which in FIG. 2 is represented as a voice-based response and a text-based response.

To generate the response, the preferred embodiment uses customer information that is received from the virtual customer database 32 to determine that the user of the wireless terminal 14 has a profile with the airline. The profile is capable of providing the user's customer ID and possibly a virtual key that is associated with that customer that authorizes the wireless terminal 14 to receive data from the airline's database. This information allows the multi-modal messaging system 10 to authenticate and identify the user of the wireless terminal 14 in order to generate an appropriate response from the airline's data files.

Figure 3:
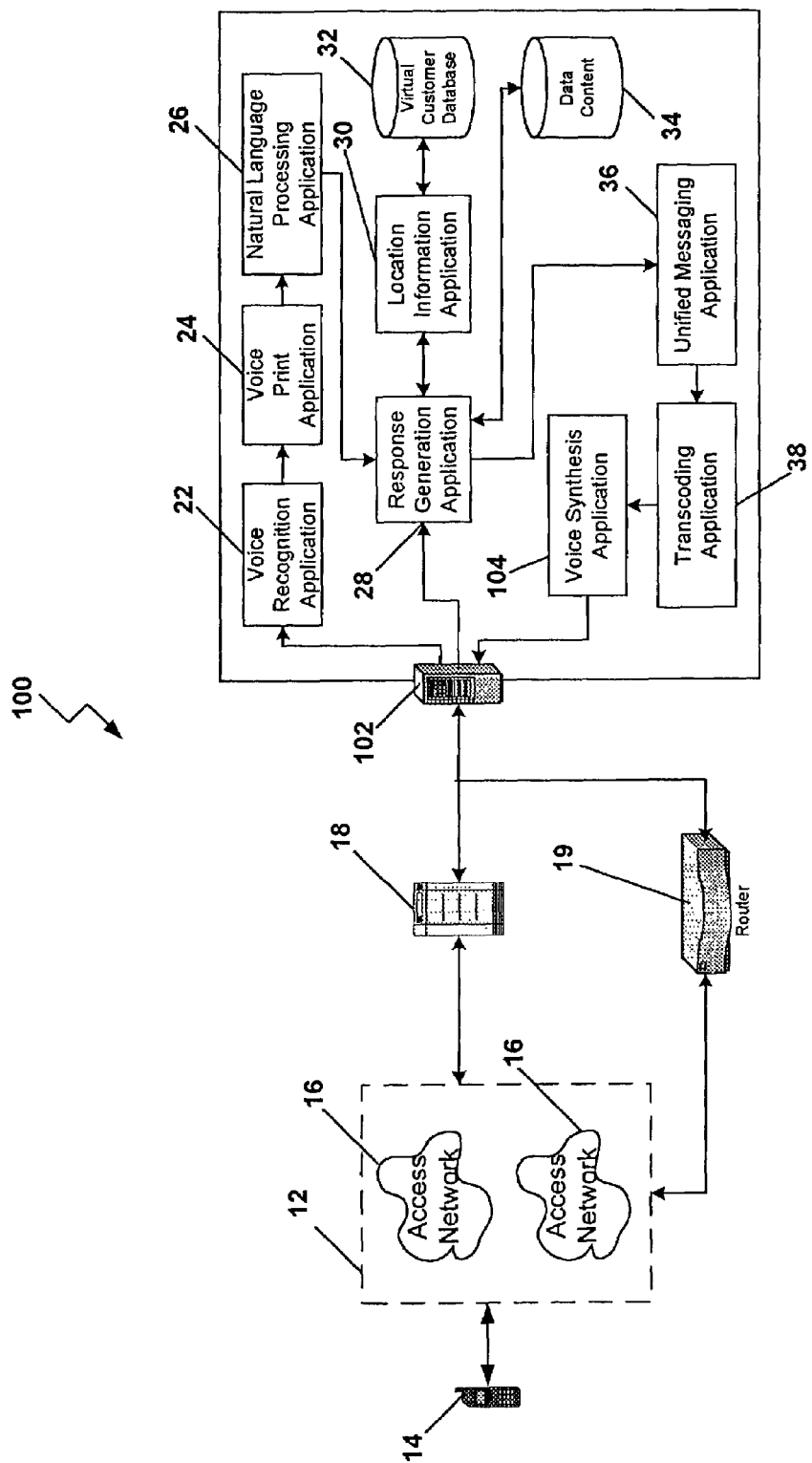
FIG. 3 illustrates a preferred embodiment of a multi-modal callback system for use in a wireless communication system.

Referring to FIG. 3, wherein like reference numbers refer to the same elements set forth in the previous embodiments, another preferred embodiment of the present invention discloses a multi-modal callback system 100 for a wireless terminal 14 that is connected to at least one wireless access network 16. As illustrated, the wireless communication system 12 is connected to at least one switch 18 and/or a router 19, which is in turn, connected to a multi-modal callback server 102. The multi-modal callback server 102 may be the same server as the multi-modal message server 20 set forth in the previous embodiments or may be another server. As illustrated, the multi-modal callback server 102 preferentially includes many of the same applications as the multi-modal message server 20.

The multi-modal callback system 100 provides a method for initiating a telephone call between the wireless terminal 14 and the multi-modal callback server 102 for transmitting a predefined speech-based message to the user of the wireless terminal 14. The call is preferably initiated in an automated fashion by the wireless terminal 14 after the wireless access network 16 receives a message that is transmitted from the wireless terminal 14 to the multi-modal callback server 102 requesting a callback. During the callback, the wireless terminal 14 receives a voice-based message that reads a text-based message to the user of the wireless terminal 14.

During normal operation, the user of the wireless terminal 14 preferentially generates a request for information that is transmitted to the multi-modal callback server 102. The preferred request for information is in the form of a voice-based request for information that is generated using normal speech. The voice request for information can be transmitted in the form of a short message that is sent from the wireless terminal 14 to the multi-modal callback server 102. In one preferred embodiment, the wireless terminal 14 does not establish a permanent connection with the multi-modal callback server 102 when the request for information is sent to the multi-modal callback server 102. The wireless terminal 14 can also transmit the request for information to the multi-modal callback server 102 in the form of a text message. In the preferred embodiment illustrated in FIG. 1, the preferred wireless terminal 14 is illustrated as a wireless phone, but those skilled in the art should recognize that other wireless communication devices (e.g.—PDAs, laptops, and various other types of personal communication devices) could be used as a wireless terminal 14.

In the preferred embodiment of the present invention, a multi-modal response to the request for information is preferentially generated by the multi-modal callback server 102 and sent to the wireless terminal 14. The multi-modal response preferentially includes at least a text-based response and a speech-based response. Other types of responses may also be included in the multi-modal response including an email response, an instant message response, and a fax response.

Referring to FIG. 3, once the voice request for information is received by the multi-modal callback server 102, a voice recognition application 22 is used to identify a plurality of words contained in the request for information if the request is in the form of a voice-based request for information. After the words in the voice-request for information are identified, a voice print application 24 can be used to verify that the user has access rights to the multi-modal callback system 100. A natural language processing application 26 can be used to determine an intent associated with the words contained in the voice-based request for information. The identity of the words and the intent of the words are then used to generate an input to a response generation application 28.

The response generation application 28 uses the input to generate a response to the request for information that is sent by the user of the wireless terminal 14. The response generation application 28 preferentially accesses a data content database 34 to retrieve information that is responsive to the request for information. The data content database 34 may be located on the multi-modal callback server 102 or on a data server that is connected to the multi-modal callback server 102.

A location information application 30 may also be included that is used to determine the geographic location of the wireless terminal 14. The geographic location of the wireless terminal 14 is used for requests for information that are dependent upon the geographic location of the user. A virtual customer database 32 may also be included that contains a plurality of user profiles. The user profiles can be used to grant access to the data content database 34 and to authorize the user of the wireless terminal 14. For more information about the virtual customer database 34 reference is made to a co-pending application filed by the same inventors and assigned U.S. application Ser. No.: 10/264, 219 and entitled Virtual Customer Database, which is hereby incorporated by. reference in its entirety.

The preferred multi-modal callback system 100 also includes a voice synthesis application 104. The voice synthesis application 104 is a text-to-speech application that is used to convert text-based responses into a synthesized human voice. As such, if the response generation application 28 generates a text-based response to the request for information, the user of the wireless terminal 14 is capable of having the text contained therein read back to them over the wireless terminal 14, as set forth in greater detail below. It is worth noting that the present invention could also be used to audibly play back any kind of text-based message that is sent to the wireless terminal 14, such as short messages or instant messages.

The response generation application 28 is used to generate a multi-modal response to the user's request for information. In the preferred embodiment of the present invention, the multi-modal response includes a text-based response that is displayed on the display of the wireless terminal 14. At some particular times, such as when driving, users of the wireless terminal 14 may not be able to read the text-based response or may just want to have the text-based response stated in a voice-based response. The preferred embodiment of the present invention allows users of the wireless terminal 14 to convert the text-based response into an audible response if desired.

The preferred multi-modal response includes an interaction menu that is generated on a display of the wireless terminal 14 that allows the user to obtain additional information that may be categorized in the information contained in the text-based response of the multi-modal response. The text-based response may also include graphic information that is representative of a response, such as a trademark or service mark of a respective company. The interaction menu is preferentially setup so that a keypad of the wireless terminal 14 can be used to allow the user to select items from the interaction menu. A pointing device, such as a mouse or touch-pad, may also be used to allow the user to select an item from the interaction menu. The user of the wireless terminal 14 can also use voice-based commands to select items contained in the interaction menu.

After the multi-modal response has been sent to the wireless terminal 14, the connection between the wireless terminal 14 and the multi-modal callback server 102 is preferentially terminated. This may be done for several reasons that relate to cost and proficiency of the multi-modal callback system 100 amongst other reasons. For example, the connection may be terminated so that the multi-modal callback server 102 can focus on other requests from other users thereby processing requests faster. In addition, there is typically a charge associated with the use of air or access time from the wireless communication system 12 and as such, the user will likely want to minimize use in order to keep charges down. In IP-based wireless access networks, the wireless terminal 14 is always connected to the wireless access network. In these types of networks, it is simply sufficient to note that the connection between the two devices is no longer current or active and must be re-established.

Once the user selects an item from the interaction menu generated on the wireless terminal 14, a menu selection request is sent to the multi-modal server 102 using a wireless communication protocol, such as SMS. In the first response to the request for information, a predefined callback number or address is embedded into each item on the interaction menu so that the wireless terminal 14 knows where to locate and obtain the information that is associated with each item listed in the interaction menu. In response to this selection by the user, the wireless terminal 14 establishes a connection to the multi-modal server 102 that is indicated by the predefined callback number or address. In an alternative preferred embodiment of the present invention, the multi-modal server 102 may simply receive a short message from the wireless terminal 14 that causes the multi-modal server 102 to establish a connection with the wireless terminal 14.

After establishing a connection with the wireless terminal 14, the multi-modal callback system 100 preferentially uses a voice synthesis application 104 to generate a voice-based message that is sent to the wireless terminal 14. As set forth above, the voice-based message is based on a previous interaction between the wireless terminal 14 and the multi-modal callback system 100. This previous interaction includes a set of transmissions including but not limited to a text message transmitted from the multi-modal messaging system 10 to the wireless terminal 14 containing instructions to the user of the wireless terminal 14 regarding: 1) the procedure for replying to the text message, 2) the use of a special code, and 3) the resulting telephone call and/or voice communication that will be initiated by the multi-modal callback system 100.

Figure 4:
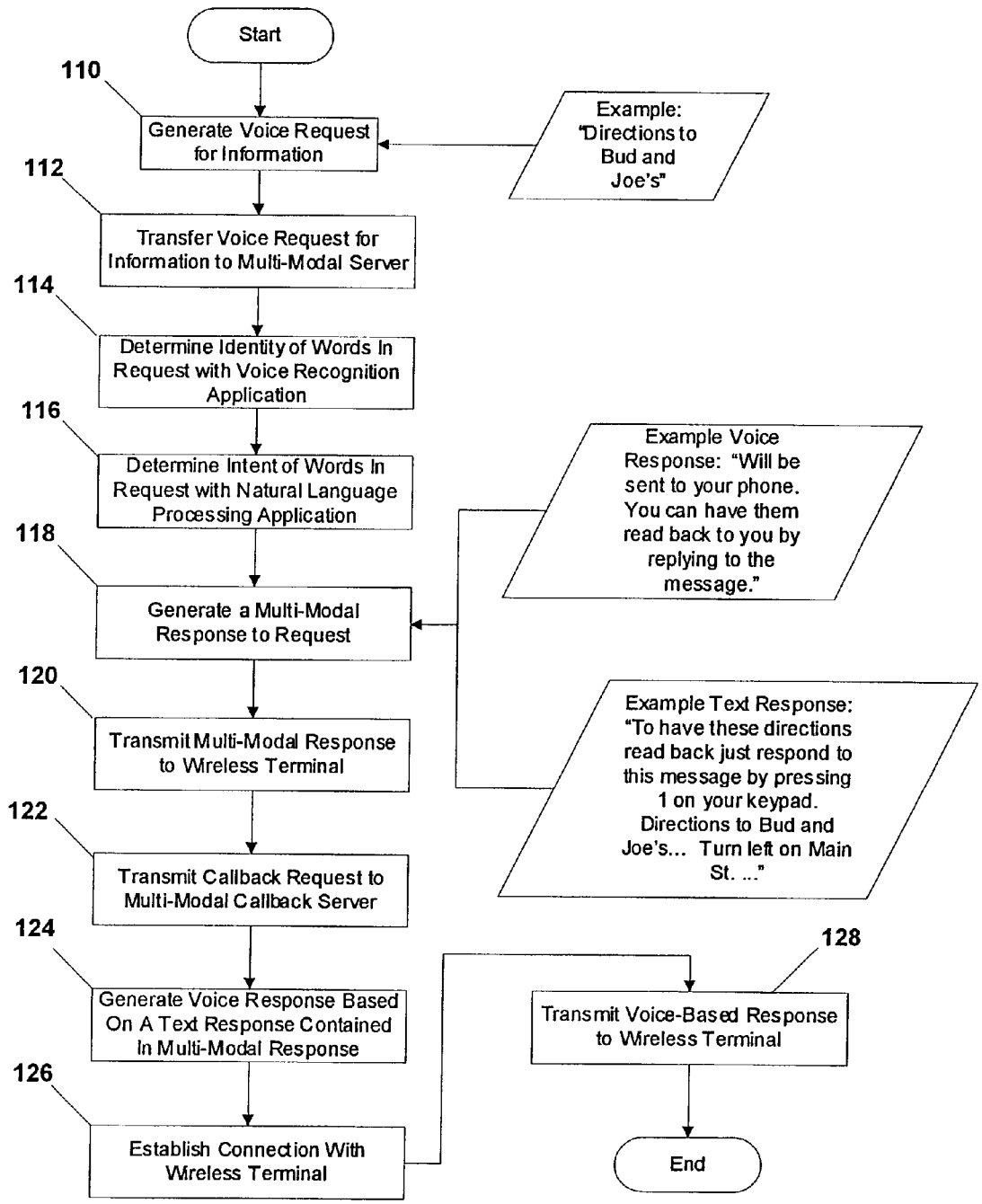
FIG. 4 illustrates the general process steps performed by a preferred embodiment of the multi-modal callback system during an illustrative operation.

Referring to FIG. 4, an illustrative operational example of the preferred multi-modal callback system 100 will be set forth below. At step 110, a user of wireless terminal 14 generates a voice-based request for information. Once generated, the voice-based request for information is sent to the multi-modal callback server 102, which is illustrated at step 112. In the present example, the user asks the multi-modal callback server 102 for "directions to Bud and Joe's". The request for information is received by the multi-modal server 102 which in turn, uses automated speech processing applications to generate a response to the request for information from the user. At step 114, a voice recognition application 22 determines the identity of the words contained in the voice-based request for information. At step 116, a natural language processing application 26 may be used to determine an intent or meaning behind the words identified by the voice recognition application 22. It is important to note that the multi-modal callback server 102 is also capable of handling text-based requests for information that are generated by the wireless terminal 14.

As set forth above, the response that is generated by the multi-modal callback system 100 may include a voice-based response and a text-based response. The response generation application 28 is used to generate a search query that searches the data content database 34 in order to retrieve the required information needed to generate a response, which is illustrated at step 118. In the case of a text-based request for information, the voice recognition application 22 and the natural language processing application 26 are simply bypassed and the user's text-based request for information is used by the response generation application 28 to generate the multi-modal response.

In our current example, the voice-based response might be as follows: "Will be sent to your phone. You can have them read back to you by replying to the message." The text-based response might be: "To have these directions read back just respond to this message by pressing 1 on your keypad. Directions to Bud and Joe's . . . Turn left on Main St. . . . " After the responses are generated, they are both transmitted to the wireless terminal 14, which is represented at step 120. Preferentially, at that point the call or connection between the multi-modal callback server 102 and the wireless terminal 14 is terminated so that the user is no longer charged for access.

After some time has elapsed, at step 122 the user enters a callback request by selecting "1" on the keypad of the wireless terminal 14 in the present example. The callback request is then transmitted to the multi-modal callback server 102, which is illustrated at step 122. The callback request indicator may either be in an interactive menu or in the text-based response. Based on the callback request, at step 124 the multi-modal callback server 102 generates a voice-based response that is based on the text-based response that was previously sent to the wireless terminal 14 as part of the multi-modal response, which is illustrated at step 126.

At step 126, the multi-modal callback server 102 establishes a connection with the wireless terminal 14. After the connection is established with the wireless terminal 14, the voice-based response is transmitted to the wireless terminal 14, which is illustrated at step 128. As set forth above, a voice synthesis application 104 is used to generate the voice-based response. The voice synthesis application 104 is preferentially capable of converting text to speech and may contain predefined voice files that may be used as responses.

Although a voice synthesis application 104 is used to generate a voice-based response in the preferred embodiment, the multi-modal callback server 102 may also generate a second text-based response that is also sent to the wireless terminal 14. The second text-based response may be sent instead of the voice-based response or with the voice-based response.

In yet another preferred embodiment of the present invention, the multi-modal callback server 102 may have already sent a text-based message to the user of the wireless terminal 14. The text-based message could be pushed to the wireless terminal 14 or pulled by the wireless terminal 14 depending upon the particular circumstances. For example, a text-based message that might be pushed to the wireless terminal 14 could be "Pizza special at Joe's Pizza, which is near your location. Press 1 for directions." An interaction item is contained in the text-based message that allows the user to select an option that is presented. In this example, the user is allowed to press 1 on the keypad for directions.

If the user of the wireless terminal 14 presses 1 on the keypad, the multi-modal callback server 102 will connect with the wireless terminal 14 and audibly reproduce directions to Joe's Pizza over the wireless terminal 14 using the voice synthesis application 104. In other words, in the embodiments set forth above the text-based message that is presented to the user is read back to the user. In this embodiment, a different message is read to the user in response to a selection of an item in the interaction menu. The message that is read to the user does not necessarily have to be the same as the text-based message that is presented to the user of the wireless terminal 14.

While the invention has been described in its currently best-known modes of operation and embodiments, other modes, embodiments and advantages of the present invention will be apparent to those skilled in the art and are contemplated herein.

What is claimed is:

1. A method for providing multi-modal callback in a wireless communication system responsive to a request for information from a wireless terminal, the method comprising the steps of:

receiving said request for information at a multi-modal callback server;

generating a multi-modal response to said request for information with a response generation application, said multi-modal response comprising a voice-based response and a text response, each mode of response including a callback request indicator;

transmitting said multi-modal response including both the voice-based response and the text response to said wireless terminal;

receiving a callback request at said multi-modal callback server based on a selection of said callback request indicator with said wireless terminal;

generating a callback response based on said callback request with said multi-modal callback server; and transmitting said callback response to said wireless terminal.

2. The method of claim 1, wherein said callback response is an automated voice-based response.

3. The method of claim 1, further comprising the step of transforming said callback response into a voice-based response with a text-to-voice application.

4. The method of claim 1, further comprising the step of disconnecting said wireless terminal from said multi-modal callback server after said multi-modal response is transmitted to said wireless terminal.

5. The method of claim 1, wherein said request for information is a voice-based request for information.

6. The method of claim 5, further comprising the step of identifying a plurality of words contained in said voice-based request for information using a voice recognition application.

7. The method of claim 6, further comprising the step of determining an intent associated with said identified words using a natural language processing application.

8. The method of claim 1, further comprising the step of determining a geographic location of said wireless terminal, wherein said multi-modal response is based at least in part on said geographic location of said wireless terminal.

9. A method of providing multi-modal callback in a wireless communication system responsive to a request for information from a wireless terminal, the method comprising the steps of:

receiving said request for information at a multi-modal callback server;

generating a multi-modal response to said request for information wit a response generation application, wherein said multi-modal response includes a voice-based response and a text response having an interaction menu including a callback request item;

transmitting said multi-modal response including bath the voice-based response and the text response to said wireless terminal;

disconnecting said wireless terminal from said multi-modal callback server;

receiving a callback request at said multi-modal callback server based on a selection of said callback request item;

generating a callback response to said callback request; and transmitting said callback response to said wireless terminal.

10. The method of claim 9, wherein said multi-modal response further includes a response that may be selected from a group of responses consisting of a voice-mail response, an email response or a fax response.

11. The method of claim 9, wherein said request for information is a voice-based request for information.

12. The method of claim 11, further comprising the step of identifying a plurality of words contained in said voice-based request for information with a voice recognition application.

13. The method of claim 12, further comprising the step of determining an intent associated with said words with a natural language processing application.

14. The method of claim 9, further comprising the step of determining a geographic location of said wireless terminal, wherein said multi-modal response is based at least in part on said geographic location of said wireless terminal.

15. The method of claim 9, wherein said callback response is a voice-based response.

16. The method of claim 9, further comprising the step of generating said callback response with a voice-to-text application.

17. A multi-modal callback system for connection to a wireless terminal through an access network, comprising:

a multi-modal callback server connected to said access network, the server being operable to receive a request for information from. Said wireless terminal;

a response generation application located on said multi-modal callback server operable to generate a multi-modal response to said request for information that is sent to said wireless terminal, and wherein said multi-modal response includes both a voice-based response and a text response, and wherein each of said voice-based response and said text response include a callback request indicator.

18. The multi-modal callback system of claim 17, wherein said callback request indicator included with said text response includes an interaction menu selection item generated on a display of said wireless terminal.

19. The multi-modal callback system of claim 17, wherein said callback request indicator includes means responsive to a selection of a predetermined keypad key of said wireless terminal.

20. The multi-modal callback system of claim 17, wherein said callback request indicator includes means responsive to a voice-based command generated by a user of said wireless terminal.

21. The multi-modal callback system of claim 17, further comprising a geographic location application operable to determine a geographic location of said wireless terminal, wherein said multi-modal response is a function of the geographic location of the wireless terminal.

22. The multi-modal callback system of claim 17, wherein said request for information is a voice-based request for information.

23. The multi-modal callback system of claim 22, further comprising a voice recognition application operable to identify a plurality of words contained in said voice-based request for information.

24. The multi-modal callback system of claim 23, further comprising a natural language processing application operable to determine an intent associated with said words.

25. The multi-modal callback system of claim 17, wherein said callback request indicator included with said text response includes a request selectable by a user of said wireless device to have said text response read aloud by said multi-modal callback server to said user of said wireless terminal.

26. A method of generating multi-modal messages for a user of a wireless terminal connected to an access network, comprising the steps of:

generating a multi-modal response to a request for information from said wireless terminal, said multi-modal response comprising both a voice-based response and a text response that each include a callback request indicator;

transmitting said multi-modal response to said wireless terminal;

terminating a connection with said wireless terminal;

reestablishing said connection in response to receipt of a selection request generated in accordance with said callback request indicator, said callback request indicator selectable with said wireless terminal; and transmitting a message to said wireless terminal in response to said selection request, said message based on said previously transmitted multi-modal response.

27. The method of claim 26, wherein said callback request indicator includes a link that maybe selected by a pointing device of said wireless terminal.

28. The method of claim 26, further comprising the step of determining a geographic location of said wireless terminal, wherein said multi-modal response is a function of the geographic location of the wireless terminal.

29. The method of claim 26, wherein said predetermined portion of said text response that is read aloud to said user is based on a user preference.

30. The method of claim 26 , wherein said callback request indicator included with said text response includes a request selectable by a user of said wireless device to allow a predetermined portion of said multi-modal response to be read aloud to said user of said wireless terminal.

31. The method of claim 26, wherein said callback request indicator included with said text response includes an interaction menu selection item generated on a display of said wireless terminal.

32. The method of claim 26, wherein reestablishing said connection comprises the initial step of generating said selection request based on selection of a keypad key of said wireless terminal that is designated with said multi-modal response.

33. The method of claim 26, wherein reestablishing said connection comprises the initial step of generating said selection request based on a voice-based command generated by a user of said wireless terminal based on identification of said voice-based command with said multi-modal response.

* * * * *

UNITED STATES PATENT AND TRADEMARK OFFICE
CERTIFICATE OF CORRECTION

| | | |
|---|---|---|
| PATENT NO. | : 7,233,655 B2 | Page 1 of 1 |
| APPLICATION NO. | : 10/263501 | |
| DATED | : June 19, 2007 | |
| INVENTOR(S) | : Michael L. Gailey et al. | |

It is certified that error appears in the above-identified patent and that said Letters Patent is hereby corrected as shown below:

Column 11,
Line 59, add a hyphen after the word "there".
Line 60, add a period after the first "of" and before the word "For".

Column 13,
Line 62, remove the period after the word "by" and before the word "reference".

Column 17,
Line 37, change "wit" to --with--.
Line 41, change "bath" to --both--.

Column 18
Line 12, change "from. Said" to --from said--.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

PATENT NO.        : 7,233,655 B2                                     Page 1 of 1
APPLICATION NO.  : 10/263501
DATED            : June 19, 2007
INVENTOR(S)      : Gailey et al.

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 119 days Delete the phrase "by 119 days" and insert -- by 5 days --

Signed and Sealed this

Twenty-first Day of July, 2009

JOHN DOLL
*Acting Director of the United States Patent and Trademark Office*